US012092070B1

(12) United States Patent
Comodi et al.

(10) Patent No.: US 12,092,070 B1
(45) Date of Patent: Sep. 17, 2024

(54) ADJUSTABLE DISTRIBUTION PLATE FOR AN AXIAL PISTON ASSEMBLY

(71) Applicant: Dana Motion Systems Italia S.R.L., Reggio Emilia (IT)

(72) Inventors: Paolo Comodi, Reggio Emilia (IT); David Gambuzzi, Reggio Emilia (IT); Luca Fontanesi, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 18/296,320

(22) Filed: Apr. 5, 2023

(51) Int. Cl.
*F01B 3/10* (2006.01)
*F03C 1/40* (2006.01)
*F04B 1/303* (2020.01)

(52) U.S. Cl.
CPC ............ *F03C 1/0692* (2013.01); *F01B 3/104* (2013.01); *F04B 1/303* (2013.01)

(58) Field of Classification Search
CPC ......... F01B 3/104; F03C 1/0692; F04B 1/303
See application file for complete search history.

(56) References Cited

U.S. PATENT DOCUMENTS 2,546,583 A * 3/1951 Born ....................... F01B 3/104 417/270
3,918,855 A 11/1975 Bornholdt
4,188,859 A 2/1980 VanWagenen et al.
7,028,470 B1 * 4/2006 Achten ................... F04B 1/303 60/419
8,250,862 B1 8/2012 Iida et al.
2020/0256332 A1 * 8/2020 Tonnqvist ............. F01B 3/0035

FOREIGN PATENT DOCUMENTS

FR 1288771 A * 2/1961 ............ F01B 3/0055
FR 2965311 A1 * 3/2012 ............ F03C 1/0647
WO 2009022918 A1 2/2009

OTHER PUBLICATIONS

FR2965311A1_t machine translation thereof. (Year: 2012).*
FR1288771A_t machine translation thereof. (Year: 1961).*
Guo, S. et al., "Hydraulic piston pump in civil aircraft: Current status, future directions and critical technologies," Chinese Journal of Aeronautics, vol. 33, No. 1, Jan. 2020, 15 pages.
"A4VG HD control device," YouTube Website, Available Online at https://www.youtube.com/watch?v=bsWBMN82M5w, Oct. 23, 2020, 4 pages.

* cited by examiner

*Primary Examiner* — Kenneth Bomberg
*Assistant Examiner* — Matthew Wiblin
(74) *Attorney, Agent, or Firm* — McCoy Russell LLP

(57) ABSTRACT

Systems and methods are provided for a hydraulic axial piston assembly. The hydraulic axial piston assembly may include a distributor plate, a bearing element directly and orthogonally connected to a side of the distributor plate, and an adjustment screw orthogonally connected to the bearing element, where the adjustment screw is externally accessible and manually rotatable to adjust a timing angle of the distributor plate.

19 Claims, 7 Drawing Sheets

ADJUSTABLE DISTRIBUTION PLATE FOR AN AXIAL PISTON ASSEMBLY

TECHNICAL FIELD

The present description relates generally to an axial piston assembly. More specifically, the present disclosure relates to an adjustment screw and a bearing element for adjusting a position of a distribution plate of an axial piston assembly.

BACKGROUND AND SUMMARY

Hydraulic axial piston assemblies are often used as standalone pumps, hydraulic motors, or compressors. A hydraulic axial piston assembly may comprise an axial piston system and a distributor system. The axial piston system may include a plurality of cylinders arranged in a circular array around a central axis. Each cylinder may contain a reciprocating piston. Different mechanisms may be used to drive the reciprocating motion of the pistons in their cylinders, such as swashplate drives. A swashplate is in effect a cam surface attached to and rotating with a crankshaft that drives or is driven by the reciprocating linear motion of the pistons. Each piston may have one or more bearings attached to it that slide or roll over the surface of the swashplate cam surface.

The reciprocating linear motion of the pistons along their longitudinal axes may drive fluid both into and out of the cylinders of the axial piston system through a distributor plate. The response of the axial piston system depends on the rotational position of the distributor plate relative to a body of the distributor system. In some examples, adjusting the rotational position of the distributor plate may require the disassembly of at least a portion of the hydraulic axial piston assembly.

Other attempts to avoid disassembling the hydraulic axial piston assembly when changing the position of the distributor plate include rotating the distributor plate via an external screw and eccentric pin that is centered directly on the distributor plate. However, the inventors herein have recognized potential issues with such systems. Such systems may require an increased thickness of the distributor plate to accommodate for the rotation of the eccentric pin around the rotational axis of the external screw. A distributor plate with increased thickness may have increased manufacturing cost and require a larger packaging space. Additionally, with only the eccentric pin rotationally coupling the adjustment screw to the distributor plate, the rotational forces of the external screw may be discharged directly on the eccentric pin, increasing the rate at which the eccentric pin may degrade.

In one example, the issues described above may be addressed by a hydraulic axial piston assembly comprising a distributor plate, a bearing element directly and orthogonally connected to a side of the distributor plate, and an adjustment screw orthogonally connected to the bearing element, where the adjustment screw is externally accessible and manually rotatable to adjust a timing angle of the distributor plate. The externally accessible adjustment screw may allow the rotatable distributor plate to be rotated to vary the behavior of the hydraulic axial piston assembly without any part of the hydraulic axial piston assembly having to be disassembled and/or reassembled. Further, the adjustment screw may discharge forces on the bearing element, instead of directly onto an eccentric pin, which may reduce degradation of the eccentric pin.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
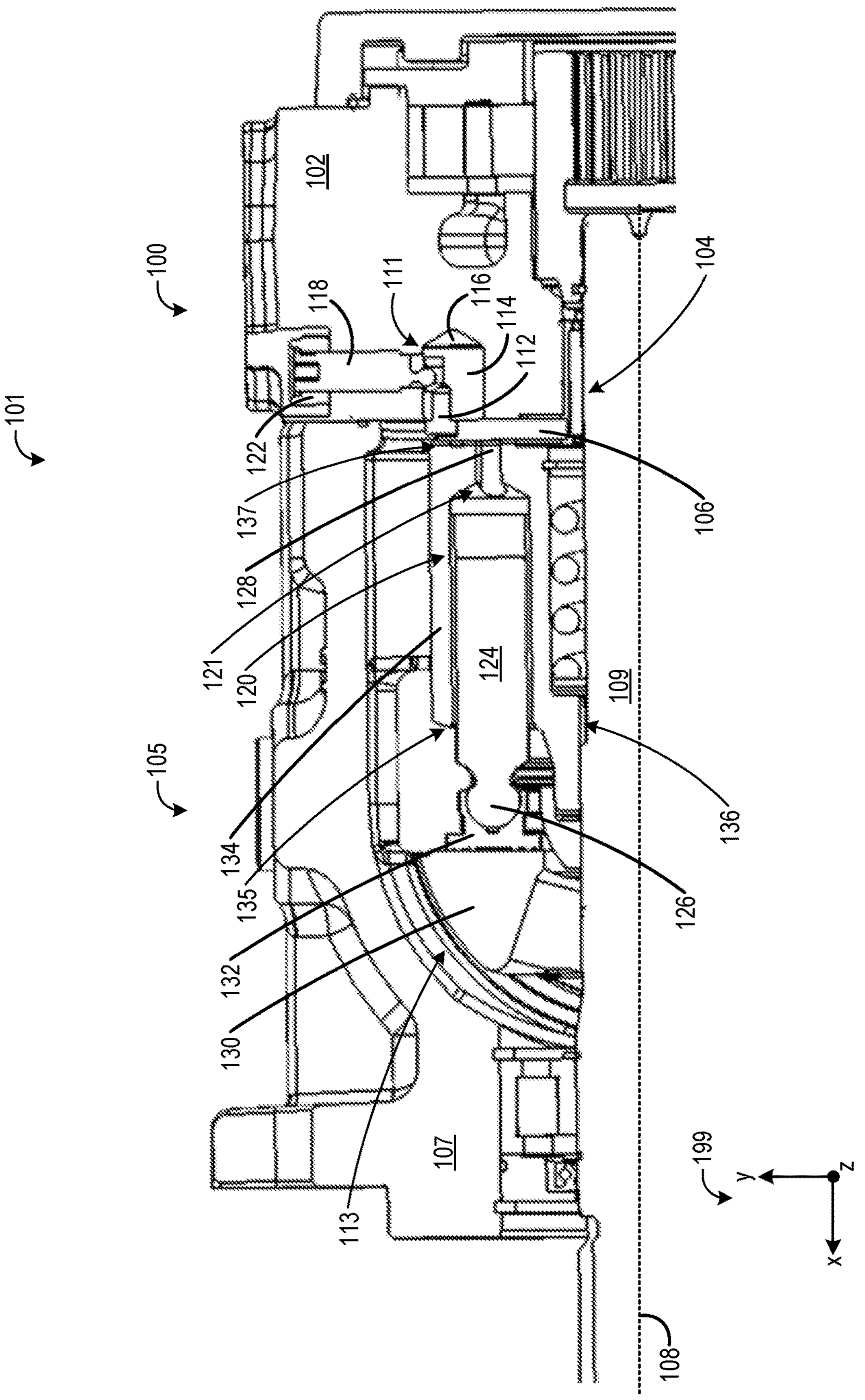
FIG. 1 shows a cross sectional view of one half of a hydraulic axial piston assembly.
Figure 2:
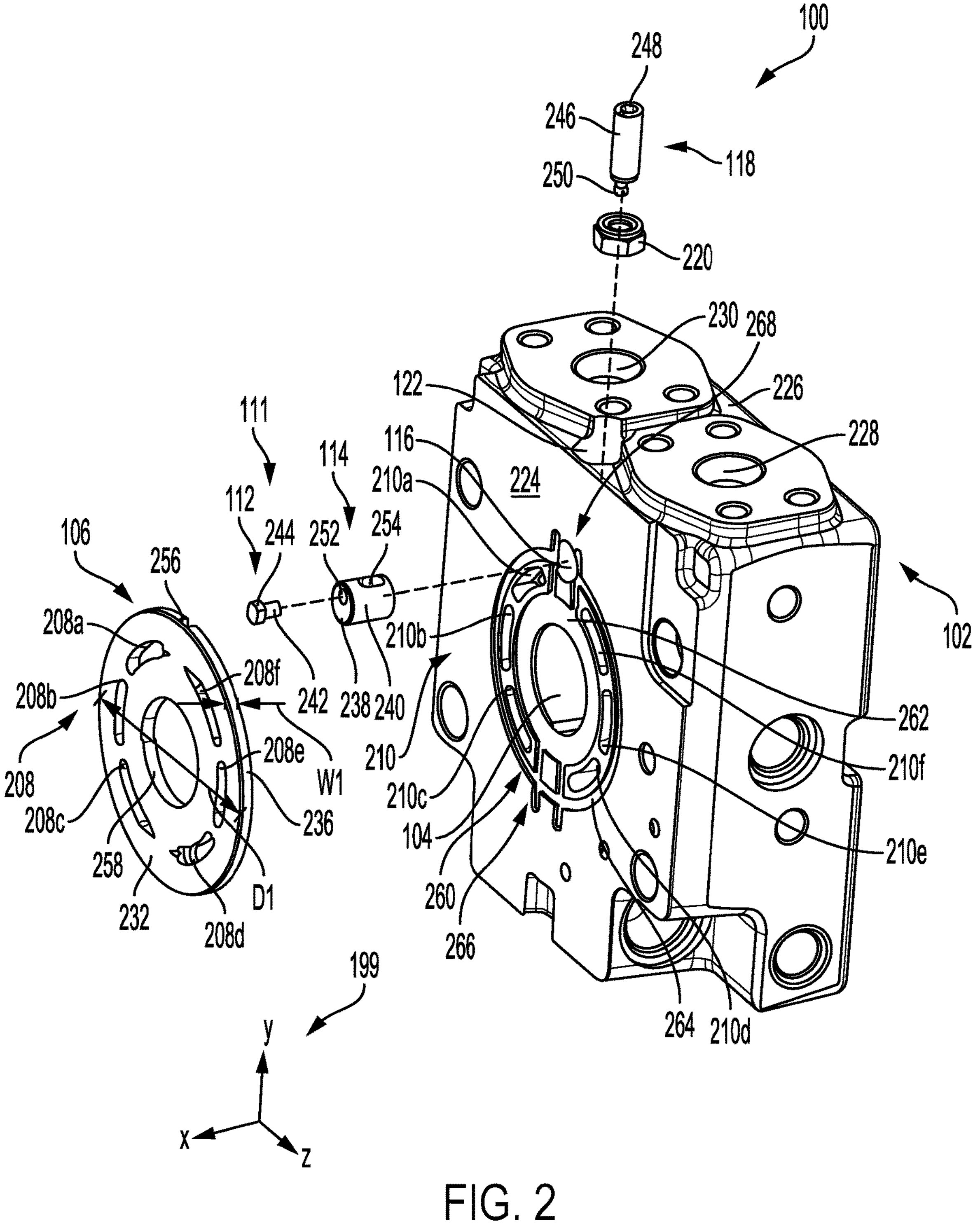
FIG. 2 shows a front perspective view of a distributor system of the hydraulic axial piston assembly of FIG. 1.
Figure 3:
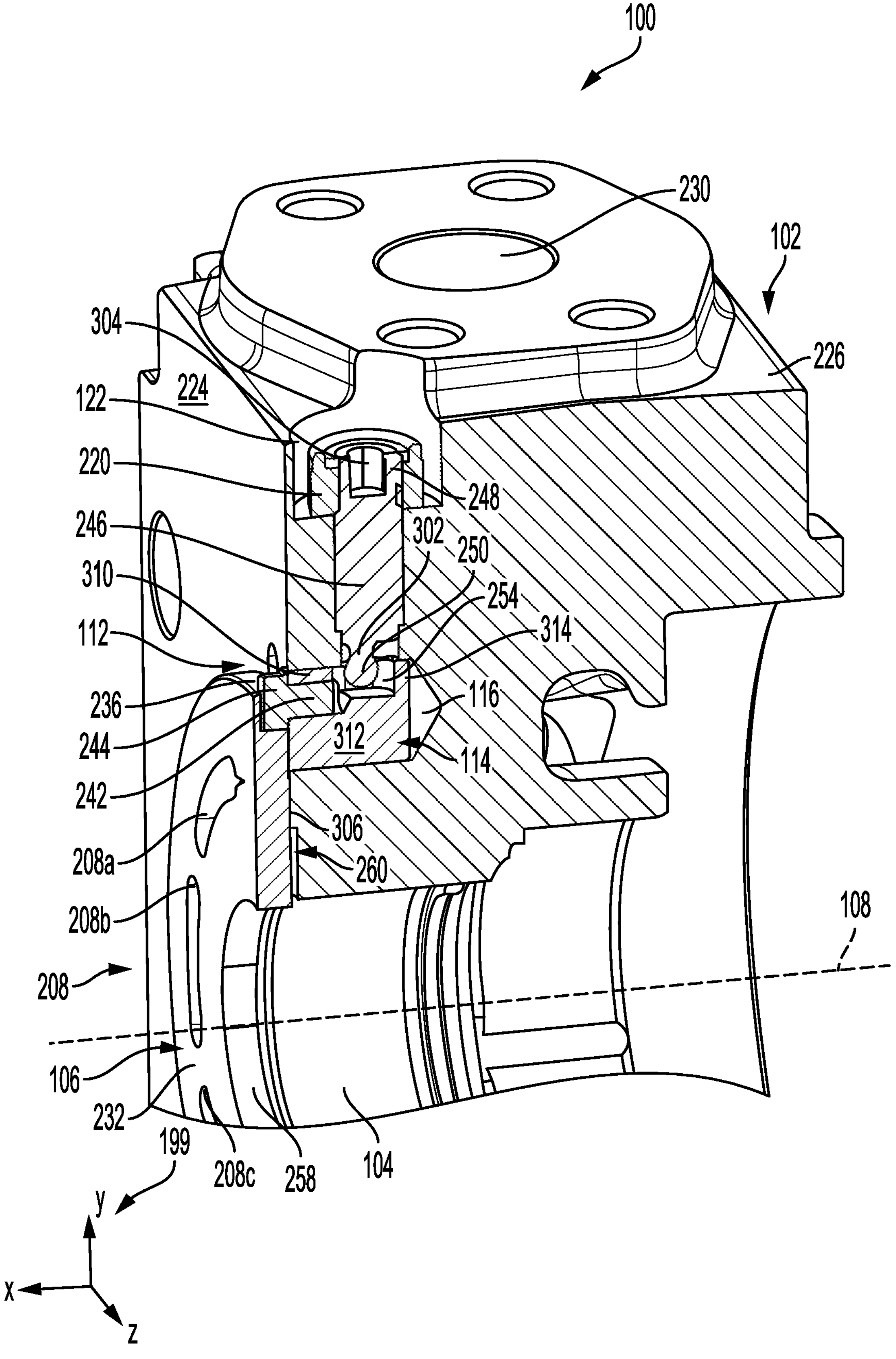
FIG. 3 shows a side perspective view of one half of the distributor system of FIG. 2.
Figure 4:
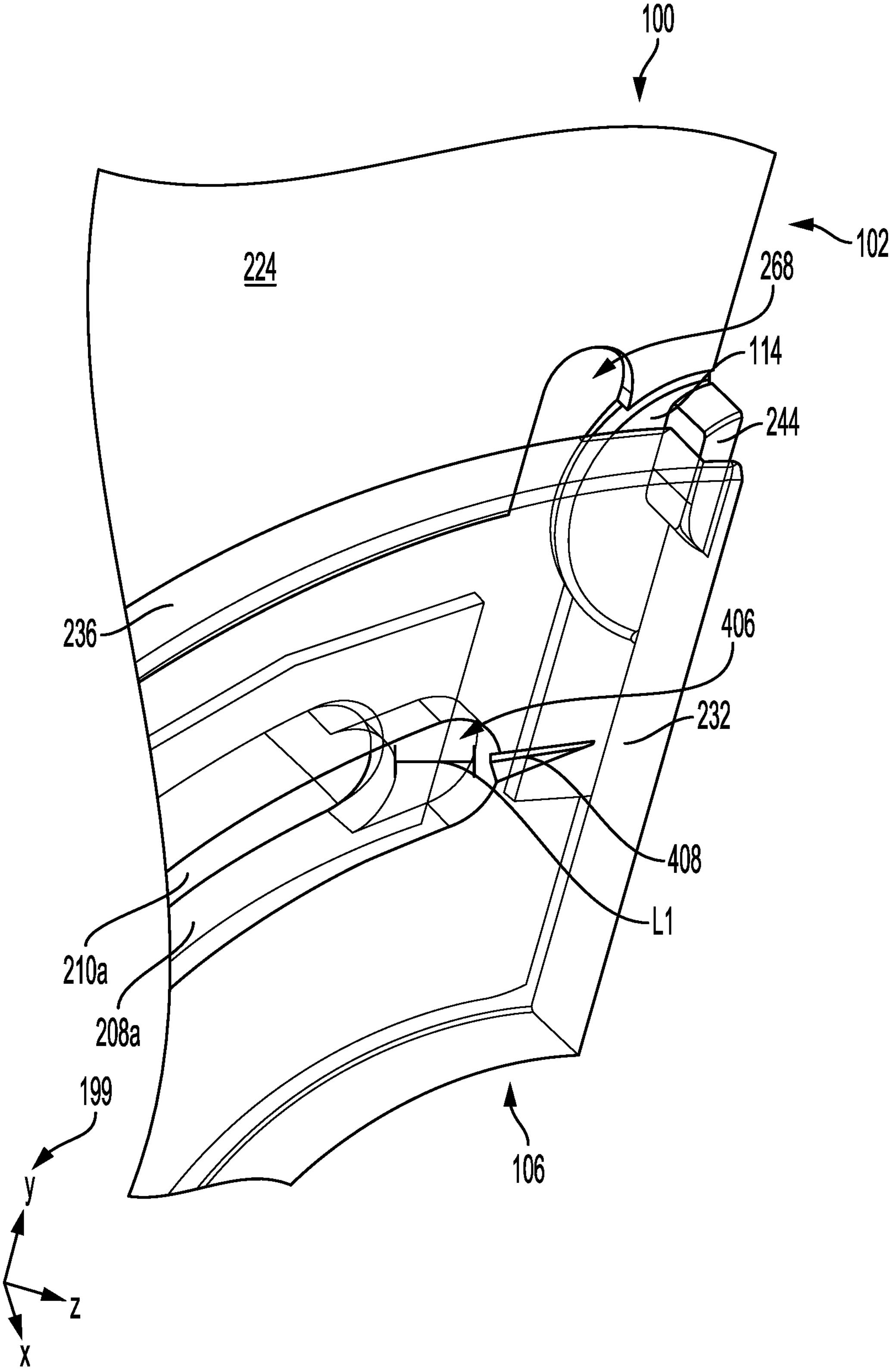
FIG. 4 shows a zoomed-in view of a bearing element and a distributor plate of the distributor system of FIG. 2.
Figure 5:
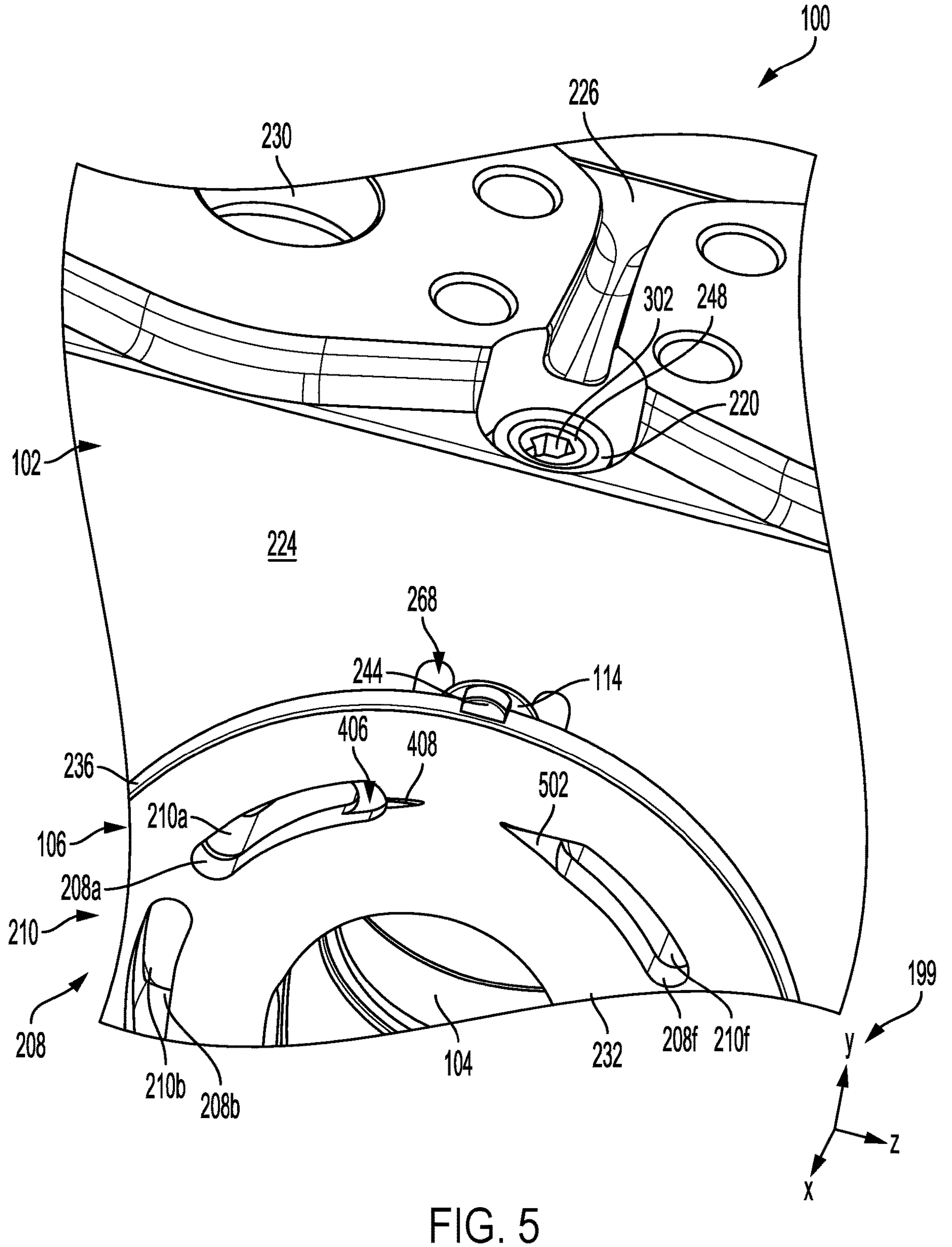
FIG. 5 shows a zoomed-in view of an adjustment screw and a distributor plate of the distributor system of FIG. 2.

FIG. 1 shows a cross sectional view of a hydraulic axial piston assembly 101, including a distributor system 100 and an axial piston system 105. FIGS. 2-4 show multiple views of the distributor system 100 and will be described collectively. FIG. 2 shows a front perspective, partially exploded view of the distributor system 100. FIG. 3 shows a side perspective view of a cross section of the distributor system 100. FIG. 4 shows a zoomed-in view of a bearing element 111 and a distributor plate 106 of the distributor system 100, where the distributor plate 106 is partially transparent to allow visualization of the underlying features. FIG. 5 shows a zoomed-in view of an adjustment screw 118 and the distributor plate 106 of the distributor system 100. FIGS. 1-5 are shown to scale, though other relative dimensions may be used.

FIGS. 1-5 include a Cartesian coordinate system 199 to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples. A filled circle may represent an arrow and axis facing toward a view. An unfilled circle may represent an arrow and an axis facing away from a view.

As shown in FIG. 1, the hydraulic axial piston assembly 101 may include a distributor system 100 and an axial piston system 105. The distributor system 100 may include a distributor body 102 and a distributor plate 106, where the distributor plate 106 may be in face sharing contact with the distributor body 102 as described in reference to FIGS. 2 and 3.

The distributor body 102 may include an adjustment screw bore 122 and a bearing element bore 116. The adjustment screw bore 122 may be cylindrical and may extend into the distributor body 102 along an axis parallel to the y-axis. The bearing element bore 116 may be cylindrical and may extend into the distributor body 102 along an axis parallel to the x-axis (e.g., the bearing element bore 116 may be orthogonal to the adjustment screw bore 122). Further, the distributor body 102 may include an adjustment screw 118 and a bearing element 111, positioned within the adjustment screw bore 122 and the bearing element bore 116, respectively. The bearing element 111 may comprise an eccentric pin 112 and a bearing body 114, where a portion of the eccentric pin 112 may be positioned within the bearing body 114. Similarly, a portion of the eccentric pin 112 may be in face sharing contact with the distributor plate 106, as described in reference to FIG. 3.

The distributor body 102 may include a shaft bore 104, where the shaft bore 104 is circular and extends into the distributor body along a central axis 108. The shaft bore 104 may be configured to accommodate a shaft 109. In some examples, the shaft 109 may be a crankshaft. The shaft 109 may be positioned within the shaft bore 104 such that the shaft 109 may extend into the distributor body 102. The longitudinal axis of the shaft 109 may be aligned with the central axis 108. Further, the shaft 109 may be configured to rotate around its longitudinal axis (e.g., around the central axis 108) within the shaft bore 104 of the distributor body 102.

The axial piston system 105 may include a shaft bore 136, a system body 107, a swashplate 130, a cylinder block 134, and a piston 124. The system body 107 of the axial piston system 105 may include an inner volume 113. The swashplate 130, the cylinder block 134, and the piston 124 may each be positioned within the inner volume 113 of the system body 107. Further, the shaft bore 136 may extend through the axial piston system 105 along the central axis 108.

The cylinder block 134 may be an annulus that is positioned circumferentially around the shaft bore 136 and that has a longitudinal axis parallel to the central axis 108. The cylinder block 134 may include a cylinder bore 120. The cylinder bore 120 may be circular and extend into the cylinder block 134 from a first side 135 of the cylinder block 134, where the first side 135 is positioned distal the distributor system 100. A first end 121 of the cylinder bore 120 (e.g., the end of the cylinder bore 120 that is positioned closest to the distributor system 100) may narrow into a fluid channel 128, which may be circular and extend from the first end 121 of the cylinder bore 120 to a second end 137 of the cylinder block 134. The second end 137 of the cylinder block 134 may be in face sharing contact with the distributor plate 106. The fluid channel 128 may fluidly couple the axial piston system 105 (e.g., the cylinder block 134) to the distributor system 100. As such, fluid may travel between the cylinder bore 120 and the distributor system 100 as described herein.

At least a portion of the piston 124 may be positioned within the cylinder bore 120 such that an outer circumferential surface of the piston 124 is in face sharing contact with the inner surface of the cylinder bore 120. The piston 124 may include a coupling end 126 that is positioned outside of the cylinder bore 120. The coupling end 126 may couple to a slipper 132 that is positioned in face sharing contact with the swashplate 130. In some examples, the slipper 132 may not be rigidly coupled to the swashplate 130, and instead may be coupled to the swashplate 130 in such a way that the slipper 132 may translate across a surface of the swashplate 130. As such, if the swashplate 130 were to rotate around the central axis 108, the slipper 132 may not rotate but instead may stay in the same position relative to the y-axis and z-axis. The swashplate 130 may be oriented such that the swashplate 130 is not orthogonal to the longitudinal axis of the shaft 109 (e.g., not orthogonal to the central axis 108). As such, one portion of the swashplate 130 may be positioned closer to the cylinder block 134 than another portion of the swashplate 130, relative to the x-axis.

The shaft 109 may extend from the shaft bore 104 of the distributor body 102 into the shaft bore 136 of the axial piston system 105 along the central axis 108. In some examples, the shaft 109 may couple to the swashplate 130. As the shaft 109 rotates around the central axis 108, the swashplate 130 may rotate around the central axis 108 simultaneously (e.g., with the same rotational speed and in the same direction) with the shaft 109. The slipper 132 may not be rigidly coupled to the swashplate 130 and therefore may not rotate around the central axis 108 with the swashplate 130 and the shaft 109. Due to the orientation of the swashplate 130 relative to the cylinder block 134 (e.g., oriented non-orthogonally), rotation of the swashplate 130 around the central axis may drive a reciprocating linear motion of the slipper 132 along an axis parallel to the x-axis. Similarly, the slipper 132 may drive a reciprocating linear motion of the piston 124 within the cylinder bore 120 via the coupling end 126 of the piston 124. The reciprocating liner motion of the piston 124 in the cylinder bore 120 may drive displacement of fluid through the fluid channel 128. As the swashplate 130 pushes the piston 124 toward bottom dead center (e.g., away from the distributor system 100) within the cylinder bore 120, fluid may be forced into the cylinder bore 120 through the fluid channel 128. Similarly, as the swashplate 130 pushes the piston 124 toward top dead center (e.g., toward the distributor system 100) within the cylinder bore 120, fluid may be forced out of the cylinder bore 120 and through the fluid channel 128. Any fluid that flows through the axial piston system 105 may also flow through the distributor plate 106 and the distributor body 102, as described in reference to FIGS. 2-5.

In other examples, the shaft 109 may couple to the cylinder block 134 and not to the swashplate 130. As the shaft 109 rotates around the central axis 108, the cylinder block 134 may rotate around the central axis 108 simultaneously with the shaft 109. The positon of the piston 124 within the cylinder bore 120 may drive the piston 124 to rotate around the central axis 108 simultaneously with the cylinder block 134 and the shaft 109. Similarly, the coupling end 126 of the piston 124 may drive the slipper 132 to rotate around the central axis 108 simultaneously with the piston 124, the cylinder block 134, and the shaft 109. As the slipper 132 rotates around the central axis 108, the slipper 132 may remain in face sharing contact with the swashplate 130. The orientation of the swashplate 130 relative to the cylinder block 134 may drive a reciprocating linear motion of the slipper 132 along an axis parallel to the x-axis as the slipper 132 rotates around the central axis 108. Similarly, the slipper 132 may drive a reciprocating linear motion of the piston 124 within the cylinder bore 120 as the piston 124 rotates around the central axis 108. As the piston 124 moves toward bottom dead center (e.g., away from the distributor system 100) within the cylinder bore 120, fluid may be forced into the cylinder bore 120 through the fluid channel 128. Similarly, as the piston 124 moves toward top dead center (e.g., toward the distributor system 100) within the cylinder bore 120, fluid may be forced out of the cylinder bore 120 and through the fluid channel 128. Any fluid that flows through the axial piston system 105 may also flow through the distributor plate 106 and the distributor body 102, as described in reference to FIGS. 2-5.

In some examples, the axial piston system 105 may include a control piston (not shown). The control piston may couple to an outer surface of the system body 107 of the axial piston system 105 and may be positioned above the swashplate 130, relative to the y-axis. The control piston may exert a force on the swashplate 130 in order to change the angle of the swashplate 130 relative to the central axis 108. As the angle of the swashplate 130 changes, the stroke of the piston 124 within the cylinder bore 120, and therefore the amount of fluid displaced by the piston 124, may change as well. In some examples, the control piston may not control the angle of the swashplate 130 but instead may sense the current displacement of the axial piston system 105 and signal to one or more additional components to change the angle of the swashplate 130.

Although the illustrated example of FIG. 1 shows the axial piston system 105 with one cylinder bore (e.g., the cylinder bore 120), one piston (e.g., the piston 124), one fluid channel (e.g., the fluid channel 128), and one slipper (e.g., the slipper 132), in some examples, the axial piston system 105 may have a plurality of cylinder bores, pistons, fluid channels, and slippers. Each cylinder bore, piston, fluid channel, and slipper in the plurality of cylinder bores, pistons, fluid channels, and slippers may be configured in the same way that the cylinder bore 120, the piston 124, the fluid channel 128, and the slipper 132 are configured in FIG. 1. Additionally, the distributor system 100, including the distributor body 102, the distributor plate 106, the bearing element 111, and the adjustment screw 118, is described in greater detail in reference to FIGS. 2-5.

As shown in FIG. 2, the distributor system 100 may include a distributor body 102. The distributor body 102 may include a plurality of apertures (e.g., bores), edges, and mounting surfaces, which may allow the distributor body 102 to couple to other components in the hydraulic axial piston assembly (e.g., the axial piston assembly) via bolts or other suitable hardware, and to accommodate various hardware such as shafts or tubing. The plurality of apertures in the distributor body 102 may be formed via a suitable process such as machining or injection molding.

The distributor body 102 may include a front surface 224 and a top surface 226, with the top surface 226 being orthogonal to the front surface 224. The top surface 226 may be an external surface of the distributor body 102. The top surface 226 may include a fluid inlet passage 228 and a fluid outlet passage 230, which may be an inlet port and outlet port of the hydraulic axial piston assembly, respectively, though the position of the inlet port and outlet port may be swapped without departing from the scope of this disclosure. In some examples, the fluid inlet passage 228 and the fluid outlet passage 230 may be positioned on raised areas of the top surface 226. Additionally, the top surface 226 may include an adjustment screw bore 122 (e.g., a first bore). The adjustment screw bore 122 may extend from the top surface 226 into the distributor body 102 along an axis that is parallel to the y-axis.

The front surface 224 may be a coupling surface, and as such may be configured to couple to the axial piston system to facilitate distribution of fluid to and from and the axial piston system. In some examples, the shaft bore 104 may be included on the front surface 224 of the distributor body 102. The shaft bore 104 may be circular and extend along an axis parallel to the x-axis, such as a central axis 108 of FIG. 3, from the front surface 224 to a back surface (not visible) of the distributor body 102. The shaft bore 104 may be configured to accommodate a shaft (e.g., a crankshaft) that is oriented perpendicular to the front surface 224, and that runs through both the front surface 224 and a back surface (not visible) of the distributor body 102. The longitudinal axis of the shaft may be aligned with the central axis 108 of FIG. 3. Further, the shaft may be configured to rotate around its longitudinal axis (e.g., around the central axis 108 of FIG. 3) within the shaft bore 104 of the distributor body 102. The shaft may couple to a swashplate or other suitable surface, and may cause one or more pistons within one or more cylinder bores of the axial piston system to rotate around the central axis 108 of FIG. 3 (e.g., the longitudinal axis of the shaft).

As each piston rotates around the longitudinal axis of the shaft, the swashplate may cause the piston to undergo reciprocating linear motion within a cylinder bore. The reciprocating linear motion of a piston within a cylinder bore may drive the displacement of fluid through the distributor system 100. As the swashplate pushes the piston toward bottom dead center (BDC), fluid may be forced into the cylinder bore. Similarly, as the swashplate pushes the piston towards top dead center (TDC), fluid may be forced out of the cylinder bore.

The front surface 224 may also include a plurality of body ports 210. The plurality of body ports 210 may comprise a first body port 210*a*, a second body port 210*b*, a third body port 210*c*, a fourth body port 210*d*, a fifth body port 210*e*, and a sixth body port 210*f*. In some examples, the first body port 210*a*, the second body port 210*b*, and the third body port 210*c* may be inlet ports. Similarly, in some examples, the fourth body port 210*d*, the fifth body port 210*e*, and the sixth body port 210*f* may be outlet ports. Each port in the plurality of body ports 210 may be arranged such that the plurality of body ports 210 are positioned concentrically around the shaft bore 104. In other examples, the plurality of body ports 210 may include a different number of total ports comprising one or more inlet ports and one or more outlet ports.

Each of the first body port 210*a*, the second body port 210*b*, and the third body port 210*c* (e.g., each of the inlet ports in the plurality of body ports 210) may be connected to the fluid inlet passage 228 on the top surface 226 of the distributor body 102. As such, fluid may flow from the fluid inlet passage 228 to each of the first body port 210*a*, the second body port 210*b*, and the third body port 210*c*. Similarly, each of the fourth body port 210*d*, the fifth body port 210*e*, and the sixth body port 210*f* (e.g., each of the outlet ports in the plurality of body ports 210) may be connected to the fluid outlet passage 230 on the top surface 226 of the distributor body 102. As such, fluid may flow from each of the fourth body port 210*d*, the fifth body port 210*e*, and the sixth body port 210*f* to the fluid outlet passage 230.

The front surface 224 of the distributor body 102 may not be completely flat (e.g., planar) and may include one or more recessed areas, such as a recessed area 260. The recessed area 260 may be recessed into the front surface 224 an amount in a range of 0.08+/−0.01 cm. A first portion 262 of the recessed area 260 may be an annulus positioned immediately surrounding the shaft bore 104 on the front surface 224. As such, the first portion 262 of the recessed area 260 may be positioned between the shaft bore 104 and the plurality of body ports 210 on the front surface 224. A second portion 264 of the recessed area 260 may be an annulus positioned surrounding the plurality of body ports 210 on the front surface 224. In this way, the plurality of body ports 210 may be positioned on an area of the front surface 224 that is surrounded by the recessed area 260 but is not itself recessed. Additionally, a bearing element bore 116 may be positioned at the topmost point, relative to the y-axis, of the second portion 264 of the recessed area 260.

The first portion 262 and the second portion 264 of the recessed area 260 may be connected by a third portion 266 and a fourth portion 268 of the recessed area 260. The third portion 266 of the recessed area 260 may comprise two oblong recesses extending downwards (e.g., relative to the y-axis) from the first portion 262 and passing through the second portion 264. The first oblong recess of the third portion 266 may be laterally offset (e.g., relative to the z-axis) from the second oblong recess of the third portion 266. The bottommost edge (e.g., relative to the y-axis) of each of the oblong recesses of the third portion 266 may be rounded.

The fourth portion 268 of the recessed area 260 may comprise two oblong recesses extending upwards (e.g., relative to the y-axis) from the first portion 262 and passing through the second portion 264. The first oblong recess of the fourth portion 268 may be laterally offset (e.g., relative to the z-axis) from the second oblong recess of the fourth portion 268. The topmost edge, (e.g., relative to the y-axis) of each of the oblong recesses of the fourth portion 268 may be rounded. Additionally, the bearing element bore 116 may be positioned on the front surface 224 in between the first oblong recess and the second oblong recess of the fourth portion 268 of the recessed area 260.

As illustrated in FIG. 2, the distributor system 100 may also include the distributor plate 106. The distributor plate 106 may have a first flat surface 232. The distributor plate 106 may also have a second flat surface 306, as shown in FIG. 3, where the second flat surface 306 is opposite the first flat surface 232 on the distributor plate 106. The first flat surface 232 may face away from the distributor body 102 of the distributor system 100 (e.g., in the positive x-direction) and the second flat surface 306 may face toward the distributor body 102 (e.g., in the negative x-direction). As such, the first flat surface 232 may be configured to contact the axial piston system and the second flat surface 306 may be configured to contact the distributor body 102 of the distributor system 100. The first flat surface 232 may be configured to fluidly couple to one or more cylinder bores of the axial piston system. Additionally, the distributor plate 106 may include a circumferential outer surface 236, where the circumferential outer surface 236 is intermediate and orthogonal to the first flat surface 232 and the second flat surface 306. The distributor plate 106 may have a diameter D1 of approximately 10.3 cm (e.g., the diameter of the first flat surface 232 and the second flat surface 306) and a thickness W1 of approximately 0.05 cm (e.g., the width of the circumferential outer surface 236). Further, the distributor plate 106 may include a notch 256. The notch 256 may be positioned at a top-most point (e.g., relative to the y-axis) of the distributor plate 106, and may extend from the circumferential outer surface 236 downwards into the second flat surface 306.

In some examples, the distributor plate 106 may include a central bore 258 which may have a circular shape. The central bore 258 may pass through the center of the first flat surface 232 and the center of the second flat surface 306, relative to the y-z plane, of the distributor plate 106. The central bore 258 may accommodate the shaft that passes through the shaft bore 104 of the distributor body 102. Additionally, the distributor plate 106 may include a plurality of plate ports 208. The plurality of plate ports 208 may comprise a first plate port 208*a*, a second plate port 208*b*, a third plate port 208*c*, a fourth plate port 208*d*, a fifth plate port 208*e*, and a sixth plate port 208*f*. Each port in the plurality of plate ports 208 may pass through the first flat surface 232 and the second flat surface 306 of the distributor plate 106, and may be arranged such that the plurality of plate ports 208 are distributed concentrically around the central bore 258. As shown in FIG. 5, one or more ports in the plurality of plate ports 208 (e.g., the first plate port 208*a* and the sixth plate port 208*f*) may include tapered edges and/or pointed notches on the first flat surface 232 that do not extend through the distributor plate 106 to the second flat surface 306.

In some examples, the first plate port 208*a*, the second plate port 208*b*, and the third plate port 208*c* may be inlet ports. Similarly, in some examples, the fourth plate port 208*d*, the fifth plate port 208*c*, and the sixth plate port 208*f* may be outlet ports. In other examples, the plurality of body ports 210 may include a different number of total ports comprising one or more inlet ports and one or more outlet ports.

Each port in the plurality of plate ports 208 may be fluidly coupled to either the fluid inlet passage 228 or the fluid outlet passage 230 on the top surface 226 via a port in the plurality of body ports 210. The first plate port 208*a*, the second plate port 208*b*, the third plate port 208*c*, the fourth plate port 208*d*, the fifth plate port 208*e*, and the sixth plate port 208*f* may fluidly couple to the first body port 210*a*, the second body port 210*b*, the third body port 210*c*, the fourth body port 210*d*, the fifth body port 210*e*, and the sixth body port 210*f*, respectively. As such, fluid may flow from the fluid inlet passage 228, through each inlet port in the plurality of body ports 210, to each of the first plate port 208*a*, the second plate port 208*b*, and the third plate port 208*c* (e.g., to each inlet port in the plurality of plate ports 208). Similarly, fluid may flow from each of the fourth plate port 208*d*, the fifth plate port 208*c*, and the sixth plate port 208*f* (e.g., from each outlet port in the plurality of plate ports 208), through each outlet port in the plurality of body ports 210, and to the fluid outlet passage 230.

The reciprocating linear motion of the pistons of the axial piston system may actuate the flow of fluid through the distributor system 100, as described above. Additionally, fluid may be pumped into or out of a cylinder when the cylinder is aligned with a port in the plurality of plate ports 208. As the piston moves down toward BDC, fluid may be forced into the cylinder when the cylinder passes over one of the three inlet ports of the plurality of plate ports 208. Similarly, as the piston moves from BDC toward TDC, fluid may be forced out of the cylinder when the cylinder passes over one of the three outlet ports of the plurality of plate ports 208.

The second flat surface 306 of the distributor plate 106 may be oriented such that it is parallel to the front surface 224 of the distributor body 102. As shown in FIGS. 3-5, at least a portion of the second flat surface 306 of the distributor plate 106 may be in face sharing contact with the front surface 224 of the distributor body 102. The second flat surface 306 of the distributor plate 106 may not be in face sharing contact with the front surface 224 at the recessed area 260. As such, the second flat surface 306 may only contact portions of the front surface 224 of the distributor body 102 that are not a part of the recessed area 260. Additionally, when the distributor plate 106 is in the position shown in FIG. 3 (e.g., with the notch 256 at a vertically-highest position), each port in the plurality of plate ports 208 may be aligned with one port in the plurality of body ports 210 such that fluid may pass through one body port and one plate port in series.

As illustrated in FIG. 4, the first body port 210*a* may be aligned with the first plate port 208*a* so that at least a portion of the first plate port 208*a* is overlapping the first body port 210*a* with respect to an axis that is parallel to the x-axis. The circular arrangements of the plurality of body ports 210 and the plurality of plate ports 208 may allow for at least a portion of each body port to remain overlapped with at least a portion of a plate port when the distributor plate 106 is rotated around the central axis 108 of FIG. 3. In the position of the distributor plate shown in FIG. 4, the first plate port 208*a* includes an end area 406 that overlaps the front surface 224 of the distributor body and not the first body port 210*a*. The end area 406 may have a length L1, and may extend from one end of the first body port 210*a* to a corresponding end of the first plate port 208*a*. As such, the length L1 may change as the distributor plate 106 rotates and the position of the first plate port 208*a* changes relative to the position of the first body port 210*a*. As the length L1 of the end area 406 changes via rotation of the distributor plate 106, the amount of overlap between the first plate port 208*a* and the first body port 210*a* may also change. Additionally, as the overlap between the first plate port 208*a* and the first body port 210*a* changes (e.g., as the length L1 of the end area 406 changes), the timing angle of fluid pumped through the first plate port 208*a* and the first body port 210*a* may also change.

FIG. 4 also illustrates the first portion 262, the second portion 264, and the fourth portion 268 of the recessed area 260 positioned partially behind (e.g., relative to the x-axis) the distributor plate 106. The recessed area 260 may reduce the amount of friction between the distributor plate 106 and the front surface 224 of the distributor body 102 as the distributor plate 106 rotates. Further, the shape of each portion of the recessed area 260 may not prevent the distributor plate 106 from creating a seal with the front surface 224 of the distributor body 102. As such, fluid may be confined to passing through the plurality of plate ports 208 and the plurality of body ports 210 when being pumped through the front surface 224 of the distributor system 100.

The distributor plate 106 may include one or more tapered edges on the plurality of plate ports 208, such as the first tapered edge 408 on the first plate port 208*a*. As illustrated in FIG. 5, the one or more tapered edges may each have a different size and shape. The first tapered edge 408 may be shorter in length (e.g., relative to the z-direction), shorter in height (e.g., relative to the y-axis), and less deep (e.g., relative to the x-axis) than a second tapered edge 502. In some examples, one or more of the tapered edges, such as the first tapered edge 408 and the second tapered edge 502, may be pyramidal in shape.

As shown in FIG. 2, the distributor system 100 may include the bearing element 111 (e.g., an eccentric bearing) comprising a bearing body 114 and an eccentric pin 112. The bearing body 114 may be cylindrical and may have a front surface 238 and a back surface (not visible in FIGS. 2-5), where the back surface is opposite the front surface 238. The front surface 238 and the back surface may both be flat and circular in shape. The front surface 238 may include a front bore 252, which may be eccentrically positioned on the front surface 238. The front bore 252 may be circular and extend from the front surface 238 into the bearing body 114 along an axis parallel to the x-axis. Additionally, the bearing body 114 may include an outer circumferential surface 240, which is intermediate and orthogonal to the front surface 238 and the back surface. The outer circumferential surface 240 may include a top bore 254. The top bore 254 may be an oval or an ellipsis, and may extend from the top (e.g., relative to the y-axis) of the outer circumferential surface 240 downward into the bearing body 114 along an axis parallel to the y-axis. The eccentric pin 112 may include a base 242 and a head 244, where the base 242 is coupled to the head 244.

The distributor system 100 may include the adjustment screw 118 and a lock nut 220. The adjustment screw 118 may comprise a body 246, a longitudinal end 248, and a coupling end 250, where the body 246 may be intermediate the longitudinal end 248 and the coupling end 250. As such, the longitudinal end 248 may be couple to the body 246, and the body 246 may couple to the coupling end 250. In some examples, the lock nut 220 may be a sealing lock nut.

Referring to FIG. 3, the bearing element 111 may be positioned (e.g., housed) in the bearing element bore 116 (e.g., a second bore) of the distributor body 102. The bearing element bore 116 may have a circular shape, and may extend from the front surface 224 into the distributor body 102 along an axis parallel to the x-axis. In some examples, the bearing element bore 116 may end in a conical shape. The bearing element bore 116 may be positioned above the shaft bore 104 on the front surface 224, relative to the y-axis. Additionally, the center of the bearing element bore 116 may be aligned with the center of the shaft bore 104 along the z-axis. Further, the bearing element bore 116 may be positioned such the bottommost point of the bearing element bore 116 is approximately aligned with the topmost point of the plurality of body ports 210, relative to the y-axis. The distributor plate 106 may at least partially overlap the bearing element bore 116 when viewed from the front, which is also illustrated in FIGS. 4 and 5. In some examples, the distributor plate 106 may overlap 80% of the bearing element bore 116. The bearing body 114 may be positioned within the bearing element bore 116 in such a way that the outer circumferential surface 240 of the bearing body 114 may be in face sharing contact with the inner surface of the bearing element bore 116.

The front surface 238 of the bearing body 114 may be oriented in the same direction as the front surface 224 of the distributor body 102 (e.g., pointed along the x-axis). Additionally, the front surface 238 of the bearing body 114 may be coplanar with the front surface 224, such that both the front surface 238 and the front surface 224 may extend in the x-z plane. In some examples, the front bore 252 may extend approximately 50% of the way into the bearing body 114 along an axis parallel to the x-axis. The front bore 252 may accommodate the base 242 of the eccentric pin 112, while the head 244 of the eccentric pin 112 may extend outwards past the front surface 238 of the bearing body 114, relative to the x-axis.

The base 242 of the eccentric pin 112 (e.g., the front bore 252) may be positioned between an upper lip 310 of the bearing body 114 and a lower portion 312 of the bearing body 114. The upper lip 310 may be positioned above (e.g., relative to the y-axis) the base 242 of the eccentric pin 112 such that the upper lip 310 is between the base 242 and the top (e.g., relative to the y-axis) of the inner surface of the bearing element bore 116. The upper lip 310 may be thinner (e.g., relative to the y-axis) than the lower portion 312 of the bearing body 114, such that the position of the base 242 of the eccentric pin 112 is eccentrically positioned relative to the y-axis.

In some examples, the head 244 of the eccentric pin 112 may have a rectangular shape when viewed from the side, as shown in FIG. 3. When viewed from the front, as shown in FIGS. 4 and 5, the head 244 of the eccentric pin 112 may comprise two straight edges that are parallel to the y-axis and two semi-circle shapes above and below the straight edges. Additionally, the head 244 of the eccentric pin 112 may have a thickness that is approximately equal to the thickness of the distributor plate 106, relative to (e.g., along an axis parallel to) the x-axis.

As illustrated in FIG. 3, the notch 256 of the distributor plate 106 may accommodate at least a portion of the head 244 of the eccentric pin 112. The head 244 may be in face sharing contact with the notch 256 in such a way that the head 244 may not move freely within the notch 256. As such, when the head 244 of the eccentric pin 112 rotates around a rotational axis of the bearing body 114, the head 244 may exert a rotational force on the distributor plate 106. In this way, the eccentric pin 112 may drive rotation of the distributor plate 106 around the central axis 108 (e.g., an axis that passes perpendicularly through the center of the first flat surface 232 and the second flat surface 306 of the distributor plate 106). Similarly, a crankshaft of the axial piston system may rotate around the central axis 108. Further, the central axis 108 may define the central axis of a circular array of cylinders in the axial piston system.

The base 242 of the eccentric pin 112 may be positioned within the front bore 252 of the bearing body 114. As such, the eccentric pin may be positioned eccentrically in the bearing body 114 (e.g., closer to a top of the bearing body 114 than a bottom of the bearing body 114). The base 242 of the eccentric pin 112 may be in face sharing contact with the inner surface of the front bore 252 such that the eccentric pin 112 is unable to move translationally within the bearing body 114. However, the eccentric pin 112 may rotate around its longitudinal axis (e.g., an axis parallel to the x-axis) within the front bore 252. In this way, the notch 256 of the distributor plate 106 may accommodate the head 244 of the eccentric pin 112 while the bearing body 114 and/or the distributor plate 106 rotate around their respective rotational axes.

As shown in FIG. 3, the top bore 254 of the outer circumferential surface 240 may extend approximately 30% of the way into the bearing body 114 along an axis that is parallel to the y-axis. The top bore 254 may accommodate the coupling end 250 of the adjustment screw 118 between a back wall 314 and the upper lip 310. The back wall 314 may extend upwards (e.g., relative to the y-axis) from the lower portion 312 of the bearing body 114. As such, a top edge of the back wall 314 of the bearing body 114 may be in face sharing contact with the inner surface of the bearing element bore 116.

The coupling end 250 of the adjustment screw 118 may be spherical in shape and may extend from the body 246 of the adjustment screw 118 via a connector 304. The connector 304 may have a smaller radius than either the adjustment screw 118 or the coupling end 250. In some examples, the size and shape of the coupling end 250 and the connector 304 may allow the coupling end 250 to lock into a slot (e.g., the coupling end 250 may be prevented from translational movement in one or more directions). For example, the coupling end 250 may be inserted vertically (e.g., along an axis parallel to the y-axis) into a bore (e.g., the top bore 254) and moved translationally in a direction perpendicular to the longitudinal axis of the adjustment screw 118 (e.g., perpendicular to the y-axis). In this way, the connector 304 may be positioned into a notch or slot (e.g., an opening) with a radius smaller than the radius of the coupling end 250. As such, the coupling end 250 may not be able to translate vertically (e.g., along an axis parallel to the y-axis) and the adjustment screw 118 may be locked in place by the notch or slot.

The body 246 of the adjustment screw 118 may have a cylindrical shape and may be positioned (e.g., housed) within the adjustment screw bore 122. The adjustment screw bore 122 may be open to atmosphere (e.g., externally accessible) through the top surface 226 (e.g., an external surface) of the distributor body 102. The adjustment screw 118 may be shorter than the adjustment screw bore 122, and therefore the adjustment screw 118 may fit completely into the adjustment screw bore 122. The body 246 may include threads that allow the adjustment screw 118 to couple to the adjustment screw bore 122. Similarly, at least a portion of the adjustment screw bore 122 may include threads that couple to the threads on the body 246 of the adjustment screw 118. In this way, the body 246 of the adjustment screw 118 may be in face sharing contact with the adjustment screw bore 122. In some examples, as shown in FIG. 3, a lower portion of the adjustment screw bore 122 may have a smaller radius than a higher portion of the adjustment screw bore.

As illustrated in FIGS. 3 and 5, the longitudinal end 248 of the adjustment screw 118 may include a tool slot 302. The tool slot 302 may be of a suitable size and shape to accommodate a screwdriver, hex key, or other suitable tool that may be used to rotate the adjustment screw 118. The tool slot 302 may be externally accessible (e.g., open to atmosphere), such that the tool may be positioned within the tool slot 302 and the adjustment screw 118 may be manually rotatable by the tool without the distributor system 100 being disassembled. The longitudinal end 248 of the adjustment screw 118 and the tool slot 302 may be positioned within the lock nut 220 in the distributor system 100.

Thus, the adjustment screw 118 may be rotated by a suitable tool positioned in the tool slot 302 of the longitudinal end 248. In turn, the coupling end 250 of the adjustment screw 118 may rotate and translate at least a portion of the rotation into the bearing element 111 (e.g., the adjustment screw 118 may drive rotation of the bearing element 111) via the bearing body 114. The bearing body 114 may rotate along an axis orthogonal to the axis of rotation of the adjustment screw 118. As such, the eccentric pin 112 may rotate around the axis of rotation of the bearing body 114 simultaneously (e.g., with the same rotational speed and in the same direction) with the bearing body 114. The bearing body 114 may reduce the amount of force discharged onto the eccentric pin 112 via the adjustment screw 118, and may therefore reduce degradation of the eccentric pin 112.

The head 244 of the eccentric pin 112 may directly engage with the surfaces of the distributor plate 106 that form the notch 256. As such, the eccentric pin 112 may rotationally couple to the notch 256 of the distributor plate 106. A front surface, a bottom surface, a first side surface, and a second side surface of the head 244 may be in face sharing contact with the notch 256, allowing rotational force to be transferred from the eccentric pin 112 to the distributor plate 106 without requiring an increased thickness of the distributor plate 106. In this way, the distributor plate 106 may rotate around an axis of rotation (e.g., around central axis 108) that is parallel to, but offset from, the axis of rotation of the bearing body 114. Due to the offset rotational axes of the bearing body 114 and the distributor plate 106, as well as the position of the head 244 of the eccentric pin 112 in the notch 256, the eccentric pin 112 may also rotate within the front bore 252 around the longitudinal axis of the eccentric pin. Therefore, by rotating the adjustment screw 118 an operator may cause the distributor plate 106 to rotate. As the distributor plate 106 rotates, the behavior of the distributor system 100 may vary by changing the working pressure and timing angle of fluid passing through the distributor system 100.

Figure 6:
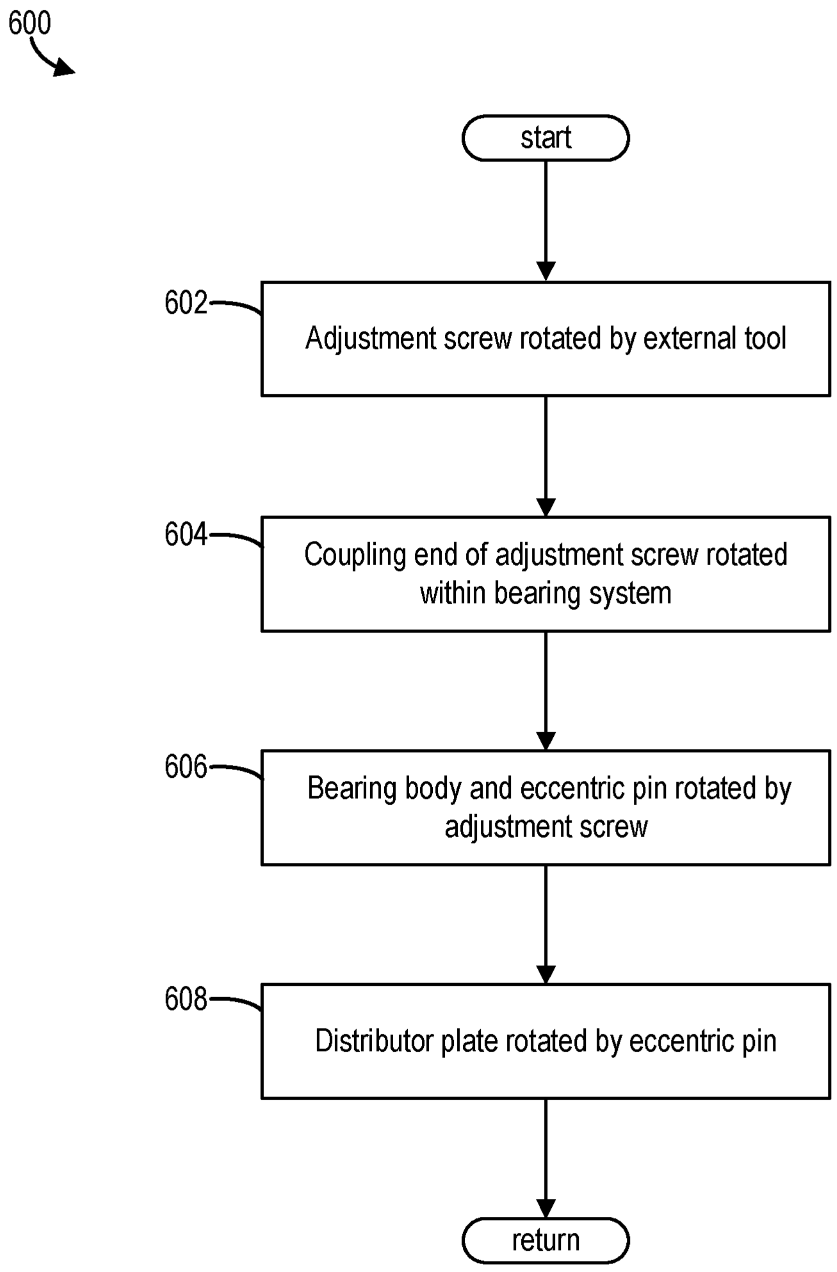
FIG. 6 is a flowchart illustrating a method for varying the behavior of the distributor system of FIG. 2.

FIG. 6 is a flowchart illustrating a method 600 for varying the behavior of a distributor system. The distributor system may be a non-limiting example of the distributor system 100 of FIGS. 1-5. Method 600 may be executed by an operator with a screwdriver, hex key or other suitable tool.

At 602, method 600 may include rotating an adjustment screw with an external tool. The external tool may be a screwdriver, hex key, or other suitable tool. The adjustment screw may be a non-limiting example of the adjustment screw 118 of FIGS. 1-5. As such, one longitudinal end of the adjustment screw may include a tool slot to fit the external tool. The external tool may exert a rotational force on the adjustment screw, causing the adjustment screw to rotate within an adjustment screw bore of a distributor body of the distributor system. The tool slot and the adjustment screw bore may be non-limiting examples of the tool slot 302 of FIG. 3 and the adjustment screw bore 122 of FIG. 1, respectively.

At 604, method 600 may include rotating a coupling end of the adjustment screw within a bearing element. The coupling end of the adjustment screw may be positioned on the longitudinal end of the adjustment screw that is distal the tool slot and thus as the adjustment screw rotates within the adjustment screw bore, the coupling end of the adjustment screw may also rotate simultaneously (e.g., with the same rotational speed and in the same direction) with the rotation of the tool end. The coupling end may be positioned within a top bore of a bearing body, such as within the top bore 254 of the bearing body 114.

At 606, method 600 may include rotating the bearing body and the eccentric pin via the adjustment screw. The adjustment screw may be rotationally coupled to the bearing body via the coupling end and the top bore. As such, a rotation of the adjustment screw via an external tool may drive a rotation of the bearing body within the bearing element bore. In some examples, the axis of rotation of the bearing body may be orthogonal to the axis of rotation of the adjustment screw. A portion of the eccentric pin may be positioned within the bearing body, and as such, the eccentric pin may be rotationally coupled to the bearing body. In this way, the eccentric pin may rotate around the rotational axis of the bearing body when the bearing body is rotated via the adjustment screw.

At 608, method 600 may include rotating a distributor plate coupled to the distributor body via the eccentric pin. As explained previously, the distributor plate may include a notch (e.g., notch 256 of FIG. 2) that may accommodate a portion of the eccentric pin such that at least a part of the eccentric pin is in face sharing contact with at least a portion of the inside surface of the notch. In this way, the distributor plate may be rotationally coupled to the eccentric pin. As such, when the eccentric pin rotates around the rotational axis of the bearing body, a rotational force is exerted on the distributor plate. The rotational force exerted on the distributor plate by the eccentric pin may cause the distributor plate to rotate around an axis that passes perpendicularly through the central bore of the distributor plate.

As the distributor plate of the distributor system rotates, the position of the plurality of plate ports on the distributor plate may be varied relative to a plurality of body ports (e.g., the plurality of body ports 210) on the distributor body of the distributor system. Fluid may be pumped first through a port in the plurality of body ports and then immediately through a port in the plurality of plate ports (e.g., fluid flowing out of the distributor system), or vice versa (e.g., fluid flowing into the distributor system). When the alignment between a port in the plurality of plate ports and a corresponding port in the plurality of body ports changes, the area that fluid can flow through to enter or exit the axial piston system may also change. The volume of each cylinder in an axial pump system may remain fixed, and therefore the volume of fluid displaced by a reciprocating piston within the cylinder may also remain fixed. Thus, if the alignment between the plurality of plate ports and the plurality of body ports changes, the velocity at which fluid displaces into and out of each cylinder of the axial piston system may change. As such, the pressure of fluid as it is pumped by the distributor system may vary based on the orientation of the plurality of plate ports relative to the plurality of body ports.

More specifically, as the distributor plate rotates, the alignment between the plurality of plate ports and the plurality of body ports may change. When the alignment between a port in the plurality of plate ports and a corresponding port in the plurality of body ports changes, the area that fluid can flow through to enter or exit the axial piston system may also change. The volume of each cylinder in an axial pump system may remain fixed, and therefore the volume of fluid displaced by a reciprocating piston within the cylinder may also remain fixed. Thus, if the plurality of plate ports becomes less aligned with the plurality of body ports (e.g., the fluid path becomes more constricted), the pressure drop across the distributor plate may increase. Similarly, if the plurality of plate ports becomes more aligned with the plurality of body ports (e.g., the fluid path becomes less constricted), the pressure drop across the distributor plate may decrease. Additionally, the rotation of the distributor plate may adjust the timing angle of the fluid that is pumped by the axial piston system. A change in the timing angle of fluid that pumped into/out of the cylinders through the three separate inlet ports and three separate outlet ports may cause the fluid to pulsate and may affect the amount of noise created by the axial piston system and distributor system.

Figure 7A:
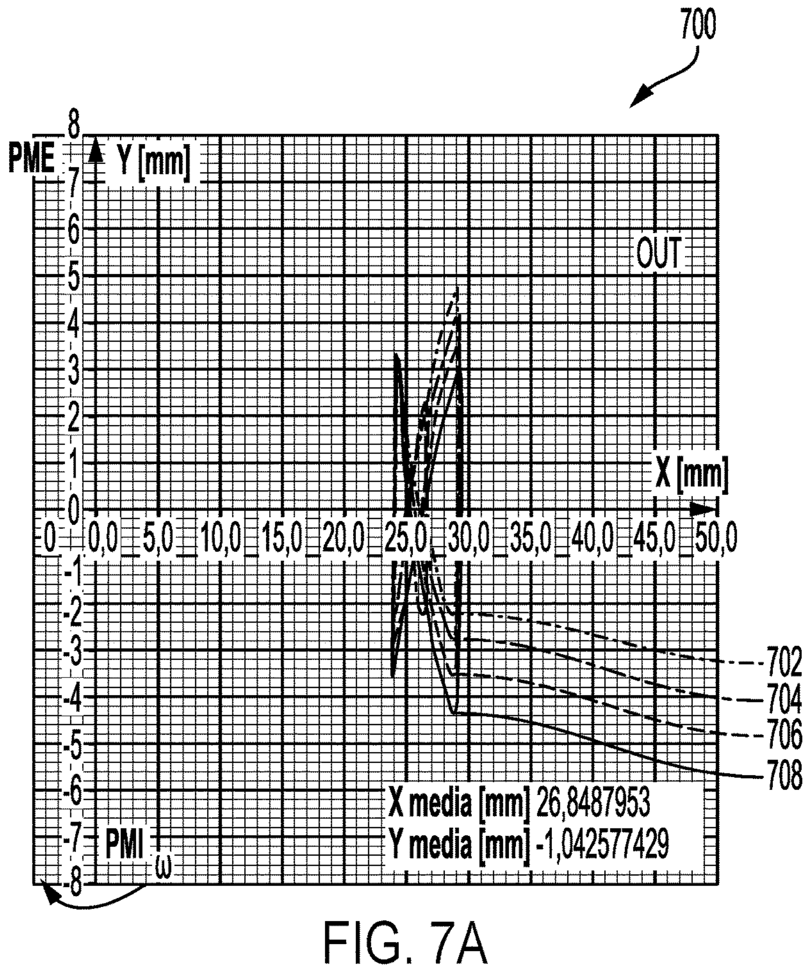
FIG. 7A is a graph illustrating a plurality of behaviors of the distributor system of FIG. 2.

FIG. 7A shows a graph 700 illustrating various behaviors of a distributor system. The distributor system may be a non-limiting example of the distributor system 100 of FIGS. 1-5 and may be a part of a hydraulic axial piston assembly, such as the hydraulic axial piston assembly 101 of FIG. 1. The hydraulic axial piston assembly may also include an axial piston system, such as the axial piston system 105 of FIG. 1. In some examples, the axial piston system may have a swashplate at an angle of 3.75 degrees relative to a distributor plate. Additionally, in some examples, the axial piston system may be operating at an operating pressure of 420 bar. Further, in some examples, the pistons of the axial piston system may be rotating at a speed of 3300 rotations per minute (rpm) around a central axis. In other examples, the angle of the swashplate relative to the distributor plate, the operating pressure, and the rotational speed of the pistons around a central axis may also be different suitable values.

Each behavior exhibited by the distributor system may illustrate the movement of a single piston relative to a given position of the distribution plate during operation of the hydraulic axial piston assembly. As the position of the piston changes relative to a given position on the distributor plate, the timing of the hydraulic axial piston assembly may change. As such, an x-axis of graph 700 may represent a position along a first axis and a y-axis of the graph 700 may represent a position along a second axis, where the second axis is orthogonal to the first axis. In some examples, the x-axis of graph 700 may represent a lateral position of the piston (e.g., an axis parallel to the plane of the distributor plate), and the y-axis of the graph 700 may represent a longitudinal position of the piston (e.g., an axis perpendicular to the plane of the distributor plate).

The graph 700 may include a first behavior 702 and a second behavior 708, which may represent a first extreme behavior and a second extreme behavior of the distributor system, respectively. The first behavior 702 may be exhibited by the distributor system when a distributor plate of the distributor system is oriented in a first extreme position. The distributor plate may be configured to rotate through a range of angles (e.g., −10 to 10 degrees, where 0 degrees is the default position shown in FIGS. 2-5), and may be oriented in the first extreme position when positioned at one limit of the angle range (e.g., rotated to −10 degrees). As such, the movement of the piston during the first behavior 702 may occur at a highest position on the graph 700, relative to the y-axis. The second behavior 708 may be exhibited by the distributor system when the distributor plate is oriented in a second extreme position. The distributor plate may be oriented in a second extreme position when positioned at a second limit of the angle range (e.g., rotated to 10 degrees). As such, the movement of the piston during the second behavior 708 may occur at a lowest position on the graph 700, relative to the y-axis, as the distributor plate may not be rotated any further away from the first extreme position.

Additionally, the graph 700 may include a first intermediate behavior 704 and a second intermediate behavior 706. The first intermediate behavior 704 may be exhibited by the distributor system when the distributor plate is oriented in a position intermediate the first extreme position and the second extreme position. As such, the movement of the piston during the first intermediate behavior 704 may occur at a position lower than the first behavior 702 but higher than the second behavior 708 on the graph 700, relative to the y-axis. Similarly, the second intermediate behavior 706 may be exhibited by the distributor system when the distributor plate is oriented in a position intermediate the first intermediate position and the second extreme position. As such, the movement of the piston during the second intermediate behavior 706 may occur at a position lower than the first intermediate behavior 704 but higher than the second behavior 708 on the graph 700, relative to the y-axis.

Each of the first behavior 702, second behavior 708, first intermediate behavior 704, and second intermediate behavior 706 may occur when the distributor plate is oriented in a different rotational position. The position of the distributor plate, and therefore the distributor timing, may also affect the position and/or reaction of a control piston. In turn, the control piston may at least in part affect the relationship between an operating pressure of the axial piston system and an amount of overturning torque on a swashplate of the axial piston system. The amount of overturning torque on the swashplate may at least in part determine the amount of fluid displaced by the axial piston system.

Figure 7B:
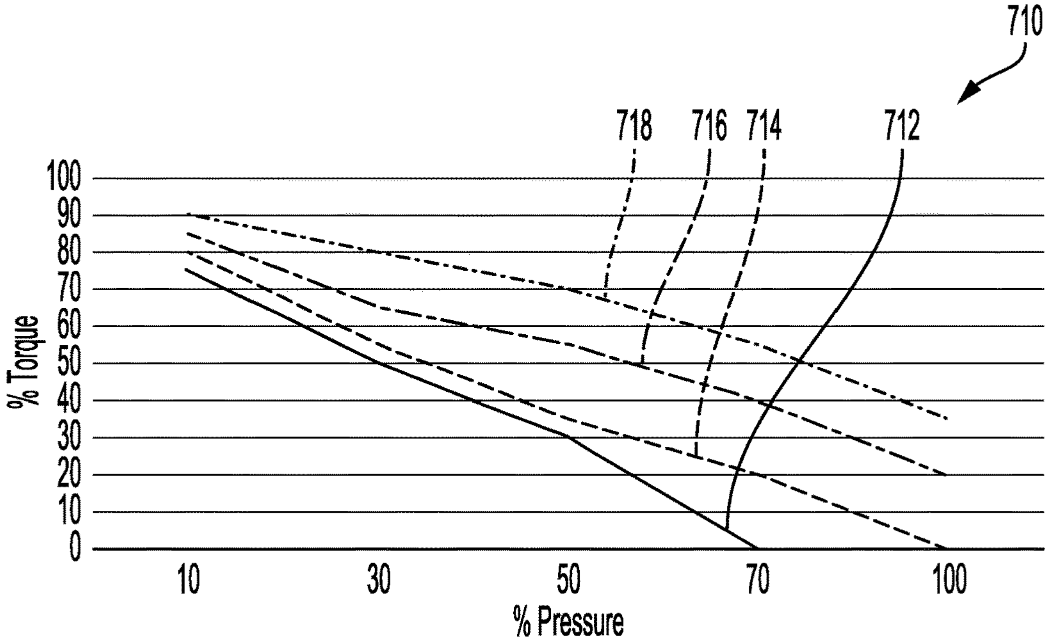
FIG. 7B is a graph illustrating a relationship between overturning torque and operating pressure for the plurality of behaviors of FIG. 7A.

FIG. 7B shows a graph 710 illustrating a relationship between the amount of overturning torque on the swashplate of the hydraulic axial piston assembly and the operating pressure of the hydraulic axial piston assembly for each distributor system behavior of FIG. 7A. As such, an x-axis of the graph 710 may represent the operating pressure of the hydraulic axial piston assembly as a percentage of the maximum operating pressure of the hydraulic axial piston assembly. A y-axis of the graph 710 may represent the overturning torque on the swashplate of the hydraulic axial piston assembly as a percentage of the maximum overturning torque on the swashplate of the hydraulic axial piston assembly.

The graph 710 may include a first relationship 712, which may correspond to the first behavior 702 of the graph 700 of FIG. 7A. As such, the first relationship 712 may occur when the distributor plate of the hydraulic axial piston assembly is oriented in a first extreme position (e.g., oriented at one limit of the angle range of the distributor plate). When the distributor plate is in the first extreme position, the operating pressure of the hydraulic axial piston assembly may be between 10% and 70% of the maximum operating pressure. The first relationship 712 may result in 75% of the maximum overturning torque on the swashplate when the operating pressure is at 10% of the maximum operating pressure. As the operating pressure increases to 70% of the maximum operating pressure, the overturning torque on the swashplate may decrease to 0% of the maximum overturning torque.

The graph 710 may include a fourth relationship 718, which may correspond to the second behavior 708 of the graph 700 of FIG. 7A. As such, the fourth relationship 718 may occur when the distributor plate of the hydraulic axial piston assembly is oriented in a second extreme position (e.g., oriented the opposite limit of the angle range of the distributor plate as the first extreme position). When the distributor plate is in the second extreme position, the operating pressure of the hydraulic axial piston assembly may be between 10% and 100% of the maximum operating pressure. The fourth relationship 718 may result in 90% of the maximum overturning torque on the swashplate when the operating pressure is at 10% of the maximum operating pressure. As the operating pressure increases to 100% of the maximum operating pressure, the overturning torque on the swashplate may decrease to 35% of the maximum overturning torque.

The graph 710 may include a second relationship 714, which may correspond to the first intermediate behavior 704 of the graph 700 of FIG. 7A. As such, the second relationship 714 may occur when the distributor plate of the hydraulic axial piston assembly is oriented in a first intermediate position (e.g., oriented between the first extreme position and the second extreme position). The second relationship 714 may result in 80% of the maximum overturning torque on the swashplate when the operating pressure is at 10% of the maximum operating pressure. As the operating pressure increases to 100% of the maximum operating pressure, the overturning torque on the swashplate may decrease to 0% of the maximum overturning torque.

The graph 710 may include a third relationship 716, which may correspond to the second intermediate behavior 706 of the graph 700 of FIG. 7A. As such, the third relationship 716 may occur when the distributor plate of the hydraulic axial piston assembly is oriented in a second intermediate position (e.g., oriented between the first intermediate position and the second extreme position). The third relationship 716 may result in 85% of the maximum overturning torque on the swashplate when the operating pressure is at 10% of the maximum operating pressure. As the operating pressure increases to 100% of the maximum operating pressure, the overturning torque on the swashplate may decrease to 20% of the maximum overturning torque.

As illustrated in FIG. 7B, for any given percentage of the maximum operating pressure, the overturning torque on the swashplate is lowest for the first relationship 712, second lowest for the second relationship 714, third lowest for the third relationship 716, and highest for the fourth relationship 718. As the distributor plate is rotated from a first extreme position to a second extreme position (e.g., from one limit of the angle range of the distributor plate to the other limit), the amount of overturning torque on the swashplate may increase if the operating pressure of the hydraulic axial piston pump remains constant. Similarly, if the position of the distributor plate remains constant, the amount of overturning torque on the swashplate may increase as the operating pressure of the hydraulic axial piston assembly decreases. In this way, the amount of overturning torque on the swashplate may be adjusted either by adjusting the operating pressure of the hydraulic axial piston assembly or by adjusting the position of the distributor plate via an externally accessible and manually rotatable adjustment screw.

The disclosure also provides support for a hydraulic axial piston assembly, comprising: a distributor plate, a bearing element directly and orthogonally connected to a side of the distributor plate, and an adjustment screw orthogonally connected to the bearing element, where the adjustment screw is externally accessible and manually rotatable to adjust a timing angle of the distributor plate. In a first example of the hydraulic axial piston assembly, the bearing element comprises a front surface, a back surface, and a circumferential outer surface and the adjustment screw comprises a coupling end, a longitudinal end, and a body positioned intermediate the coupling end and the longitudinal end. In a second example of the hydraulic axial piston assembly, optionally including the first example, the circumferential outer surface of the bearing element includes a top bore and the coupling end of the adjustment screw is positioned within the top bore. In a third example of the hydraulic axial piston assembly, optionally including one or both of the first and second examples, the hydraulic axial piston assembly further comprises: a distributor body, wherein the distributor body includes a front surface and a top surface that is orthogonal to the front surface. In a fourth example of the hydraulic axial piston assembly, optionally including one or more or each of the first through third examples, the distributor body includes a bearing element bore that extends through the front surface of the distributor body and the distributor body includes an adjustment screw bore that extends through the top surface of the distributor body and is orthogonal to the bearing element bore. In a fifth example of the hydraulic axial piston assembly, optionally including one or more or each of the first through fourth examples, the bearing element is positioned in the bearing element bore of the distributor body such that a circumferential outer surface of the bearing element is in face sharing contact with an inner surface of the bearing element bore. In a sixth example of the hydraulic axial piston assembly, optionally including one or more or each of the first through fifth examples, the adjustment screw is positioned in the adjustment screw bore of the distributor body such that the body of the adjustment screw is in face sharing contact with an inner surface of the adjustment screw bore. In a seventh example of the hydraulic axial piston assembly, optionally including one or more or each of the first through sixth examples, the adjustment screw bore is open to atmosphere and a longitudinal end of the adjustment screw includes a tool slot that is configured to accommodate a tool to rotate the adjustment screw. In an eighth example of the hydraulic axial piston assembly, optionally including one or more or each of the first through seventh examples, the distributor plate comprises a first flat surface, a second flat surface, and an outer circumferential surface. In a ninth example of the hydraulic axial piston assembly, optionally including one or more or each of the first through eighth examples, the distributor plate includes a central bore and a plurality of plate ports that extend through the first flat surface and the second flat surface. In a tenth example of the hydraulic axial piston assembly, optionally including one or more or each of the first through ninth examples, the front surface of the bearing element includes a front bore offset from a center of the front surface, and wherein a base of an eccentric pin is positioned within the front bore. In a eleventh example of the hydraulic axial piston assembly, optionally including one or more or each of the first through tenth examples, a head of the eccentric pin is coupled to the base of the eccentric pin and the head of the eccentric pin extends outwards past the front surface of the bearing element. In a twelfth example of the hydraulic axial piston assembly, optionally including one or more or each of the first through eleventh examples, the distributor plate includes a notch and an inner surface of the notch is in face sharing contact with a front surface, a bottom surface, a first side surface, and a second side surface of the head of the eccentric pin of the bearing element.

The disclosure also provides support for a hydraulic axial piston assembly, comprising: a distributor plate configured to fluidly couple one or more cylinder bores of an axial piston system to a distributor body that includes a fluid inlet passage and a fluid outlet passage, and an eccentric bearing including a pin housed within a notch of the distributor plate and configured to rotate via rotation of an adjustment screw, wherein the eccentric bearing and adjustment screw are positioned in the distributor body and wherein the adjustment screw extends orthogonally to the eccentric bearing. In a first example of the hydraulic axial piston assembly, the distributor plate fluidly couples the one or more cylinder bores of the axial piston system to the distributor body via a plurality of plate ports of the distributor plate, wherein a position of the plurality of plate ports is varied via rotation of the distributor plate. In a second example of the hydraulic axial piston assembly, optionally including the first example, the distributor body includes a plurality of body ports, wherein rotating the distributor plate changes the position of the plurality of plate ports of the distributor plate relative to a position of the plurality of body ports of the distributor body. In a third example of the hydraulic axial piston assembly, optionally including one or both of the first and second examples, rotation of the adjustment screw drives rotation of the eccentric bearing around an axis of rotation orthogonal to the axis of rotation of the adjustment screw.

The disclosure also provides support for a hydraulic axial piston assembly, comprising: an axial piston system, a distributor body coupled to the axial piston system via a coupling surface, the distributor body including a fluid inlet passage and a fluid outlet passage, the distributor body further including a first bore extending from an external surface of the distributor body to a second bore extending to the coupling surface of the distributor body, the first bore extending along a first axis that is orthogonal to a second axis along which the second bore extends, and a distributor plate configured to fluidly couple one or more cylinder bores of the axial piston system to the fluid inlet passage and the fluid outlet passage of the distributor body, wherein the distributor plate is rotatable via an eccentric bearing including a pin housed within a notch of the distributor plate and configured to rotate via rotation of an adjustment screw, wherein the eccentric bearing is housed in the second bore and adjustment screw is housed in the first bore. In a first example of the hydraulic axial piston assembly, the pin is positioned within the eccentric bearing such that the pin is offset from an axis of rotation of the eccentric bearing. In a second example of the hydraulic axial piston assembly, optionally including the first example, the adjustment screw includes a tool slot that is accessible from the external surface of the distributor body, wherein the tool slot is configured to accommodate a tool to rotate the adjustment screw.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic axial piston assembly, comprising:

a distributor plate;

a bearing element directly and orthogonally connected to a side of the distributor plate; and an adjustment screw orthogonally connected to the bearing element, where the adjustment screw is externally accessible and manually rotatable to adjust a timing angle of the distributor plate, wherein the bearing element is configured to rotate around a first rotational axis and the adjustment screw is configured to rotate around a second rotational axis that is orthogonal to the first longitudinal axis.

2. The hydraulic axial piston assembly of claim 1, wherein the bearing element comprises a front surface, a back surface, and a circumferential outer surface and the adjustment screw comprises a coupling end, a longitudinal end, and a body positioned intermediate the coupling end and the longitudinal end.

3. The hydraulic axial piston assembly of claim 2, wherein the circumferential outer surface of the bearing element includes a top bore and the coupling end of the adjustment screw is positioned within the top bore.

4. The hydraulic axial piston assembly of claim 2, wherein the front surface of the bearing element includes a front bore offset from a center of the front surface, and wherein a base of an eccentric pin is positioned within the front bore.

5. The hydraulic axial piston assembly of claim 4, wherein a head of the eccentric pin is coupled to the base of the eccentric pin and the head of the eccentric pin extends outwards past the front surface of the bearing element.

6. The hydraulic axial piston assembly of claim 5, wherein the distributor plate includes a notch and an inner surface of the notch is in face sharing contact with a front surface, a bottom surface, a first side surface, and a second side surface of the head of the eccentric pin of the bearing element.

7. The hydraulic axial piston assembly of claim 1, further comprising a distributor body, wherein the distributor body includes a front surface and a top surface that is orthogonal to the front surface.

8. The hydraulic axial piston assembly of claim 7, wherein the distributor body includes a bearing element bore that extends through the front surface of the distributor body and the distributor body includes an adjustment screw bore that extends through the top surface of the distributor body and is orthogonal to the bearing element bore.

9. The hydraulic axial piston assembly of claim 8, wherein the bearing element is positioned in the bearing element bore of the distributor body such that a circumferential outer surface of the bearing element is in face sharing contact with an inner surface of the bearing element bore.

10. The hydraulic axial piston assembly of claim 8, wherein the adjustment screw is positioned in the adjustment screw bore of the distributor body such that a body of the adjustment screw is in face sharing contact with an inner surface of the adjustment screw bore.

11. The hydraulic axial piston assembly of claim 8, wherein the adjustment screw bore is open to atmosphere and a longitudinal end of the adjustment screw includes a tool slot that is configured to accommodate a tool to rotate the adjustment screw.

12. The hydraulic axial piston assembly of claim 1, wherein the distributor plate comprises a first flat surface, a second flat surface, and an outer circumferential surface.

13. The hydraulic axial piston assembly of claim 12, wherein the distributor plate includes a central bore and a plurality of plate ports that extend through the first flat surface and the second flat surface.

14. A hydraulic axial piston assembly, comprising:

a distributor plate configured to fluidly couple one or more cylinder bores of an axial piston system to a distributor body that includes a fluid inlet passage and a fluid outlet passage; and an eccentric bearing including a pin housed within a notch of the distributor plate and configured to rotate via rotation of an adjustment screw, wherein the eccentric bearing and adjustment screw are positioned in the distributor body and wherein the adjustment screw extends orthogonally to the eccentric bearing, wherein rotation of the adjustment screw drives rotation of the eccentric bearing around an axis of rotation orthogonal to an axis of rotation of the adjustment screw.

15. The hydraulic axial piston assembly of claim 14, wherein the distributor plate fluidly couples the one or more cylinder bores of the axial piston system to the distributor body via a plurality of plate ports of the distributor plate, wherein a position of the plurality of plate ports is varied via rotation of the distributor plate.

16. The hydraulic axial piston assembly of claim 15, wherein the distributor body includes a plurality of body ports, wherein rotating the distributor plate changes the position of the plurality of plate ports of the distributor plate relative to a position of the plurality of body ports of the distributor body.

17. A hydraulic axial piston assembly, comprising:

an axial piston system;

a distributor body coupled to the axial piston system via a coupling surface, the distributor body including a fluid inlet passage and a fluid outlet passage, the distributor body further including a first bore extending from an external surface of the distributor body to a second bore extending to the coupling surface of the distributor body, the first bore extending along a first axis that is orthogonal to a second axis along which the second bore extends; and a distributor plate configured to fluidly couple one or more cylinder bores of the axial piston system to the fluid inlet passage and the fluid outlet passage of the distributor body, wherein the distributor plate is rotatable via an eccentric bearing including a pin housed within a notch of the distributor plate, the eccentric bearing configured to rotate via rotation of an adjustment screw, wherein the eccentric bearing is housed in the second bore and the adjustment screw is housed in the first bore.

18. The hydraulic axial piston assembly of claim 17, wherein the pin is positioned within the eccentric bearing such that the pin is offset from an axis of rotation of the eccentric bearing and rotation of the eccentric bearing rotates the pin.

19. The hydraulic axial piston assembly of claim 17, wherein the adjustment screw includes a tool slot that is accessible from the external surface of the distributor body, wherein the tool slot is configured to accommodate a tool to rotate the adjustment screw.

* * * * *